United States Patent
Razazian et al.

(10) Patent No.: US 9,054,786 B2
(45) Date of Patent: *Jun. 9, 2015

(54) SYSTEM AND METHOD FOR APPLYING MULTI-TONE OFDM BASED COMMUNICATIONS WITHIN A PRESCRIBED FREQUENCY RANGE

(71) Applicant: Maxim Integrated Products, Inc., San Jose, CA (US)

(72) Inventors: Kaveh Razazian, Aliso Viejo, CA (US); Maher Umari, Irvine, CA (US); Amir Hosein Kamalizad, Irvine, CA (US); Victor V. Loginov, Irvine, CA (US); Michael V. Navid, Laguna Niguel, CA (US)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/331,539

(22) Filed: Jul. 15, 2014

(65) Prior Publication Data

US 2014/0376647 A1     Dec. 25, 2014

Related U.S. Application Data

(63) Continuation of application No. 13/680,259, filed on Nov. 19, 2012, now Pat. No. 8,780,691, which is a continuation of application No. 12/478,618, filed on Jun. 4, 2009, now Pat. No. 8,315,152.

(60) Provisional application No. 61/059,684, filed on Jun. 6, 2008.

(51) Int. Cl.
*H04B 3/54*     (2006.01)
*H04B 3/14*     (2006.01)
(Continued)

(52) U.S. Cl.
CPC ............... *H04B 3/54* (2013.01); *H04B 3/143* (2013.01); *H04L 1/0009* (2013.01);
(Continued)

(58) Field of Classification Search
CPC .......... H04B 3/54; H04B 3/542; H04B 1/581; H04L 1/0071; H04L 1/04
See application file for complete search history.

(56) References Cited

U.S. PATENT DOCUMENTS

| 5,521,491 A | 5/1996 | Najam |
| 5,768,305 A | 6/1998 | Kanda |
| 5,841,385 A | 11/1998 | Xie |
| 6,347,234 B1 | 2/2002 | Scherzer |

(Continued)

FOREIGN PATENT DOCUMENTS

| CN | 101064534 A | 10/2007 |
| EP | 0657997 A1 | 6/1995 |

(Continued)

OTHER PUBLICATIONS

U.S. Appl. No. 12/478,673, filed Jun. 4, 2009, Razazian et al.

(Continued)

*Primary Examiner* — Jianye Wu

(57) ABSTRACT

According to one embodiment of the invention, an integrated circuit comprises an encoding module, a modulation module and a spectral shaped module. The encoding module includes an interleaver that adapted to operate in a plurality of modes including a first mode and a second mode. The interleaver performs repetitive encoding when placed in the second mode. The modulation module is adapted to compensate for attenuations that are to be realized during propagation of a transmitted signal over the power line. The spectral shaped module is adapted to compensate for amplitude distortion and further compensates for attenuations that will be realized during propagation of the transmitted signal over the power line.

12 Claims, 12 Drawing Sheets

(51) Int. Cl.
*H04L 1/00* (2006.01)
*H04L 1/04* (2006.01)
*H04L 1/08* (2006.01)
*H04L 25/02* (2006.01)
*H04L 25/03* (2006.01)
*H04L 27/26* (2006.01)

(52) U.S. Cl.
CPC ............ *H04L 1/0065* (2013.01); *H04L 1/0071* (2013.01); *H04L 1/04* (2013.01); *H04L 1/08* (2013.01); *H04L 25/0286* (2013.01); *H04L 25/03834* (2013.01); *H04L 27/2626* (2013.01); *H04L 27/2647* (2013.01); *H04B 3/542* (2013.01); *H04L 27/2601* (2013.01)

(56) References Cited

U.S. PATENT DOCUMENTS

| | | |
|---|---|---|
| 6,415,004 B1 | 7/2002 | Fujimura et al. |
| 6,614,864 B1 | 9/2003 | Raphaeli et al. |
| 6,727,790 B2 | 4/2004 | Raphaeli et al. |
| 6,799,193 B2 | 9/2004 | Kilani et al. |
| 6,888,790 B2 | 5/2005 | Kilani |
| 6,976,044 B1 | 12/2005 | Kilani |
| 6,983,011 B1 | 1/2006 | Hara et al. |
| 7,020,095 B2 | 3/2006 | Chini et al. |
| 7,167,456 B2 | 1/2007 | Iwamatsu et al. |
| 7,430,193 B2 | 9/2008 | Kim et al. |
| 7,433,425 B1 | 10/2008 | Lou et al. |
| 7,634,034 B2 | 12/2009 | Larsson |
| 8,315,152 B2 * | 11/2012 | Razazian et al. .............. 370/208 |
| 8,780,691 B2 * | 7/2014 | Razazian et al. .............. 370/208 |
| 2002/0051499 A1 | 5/2002 | Cameron et al. |
| 2002/0105901 A1 | 8/2002 | Chini et al. |
| 2002/0141440 A1 * | 10/2002 | Stanley et al. ................ 370/465 |
| 2002/0188908 A1 | 12/2002 | Yonge et al. |
| 2003/0156012 A1 | 8/2003 | Omidi et al. |
| 2003/0224784 A1 | 12/2003 | Hunt et al. |
| 2003/0235254 A1 | 12/2003 | Fanson et al. |
| 2004/0062326 A1 | 4/2004 | Burke et al. |
| 2004/0120249 A1 | 6/2004 | Blasco Claret et al. |
| 2005/0163261 A1 | 7/2005 | Nakao et al. |
| 2005/0281238 A1 | 12/2005 | Blasco Clarest et al. |
| 2006/0002494 A1 | 1/2006 | Zhang |
| 2006/0097574 A1 * | 5/2006 | Gidge et al. ...................... 307/3 |
| 2006/0188033 A1 | 8/2006 | Zehavi et al. |
| 2006/0252405 A1 * | 11/2006 | Matz et al. .................... 455/402 |
| 2007/0025391 A1 | 2/2007 | Yonge et al. |
| 2007/0030913 A1 | 2/2007 | Lin |
| 2007/0064788 A1 | 3/2007 | Yonge |
| 2007/0139118 A1 | 6/2007 | Teo et al. |
| 2007/0285223 A1 | 12/2007 | Spiess |
| 2008/0002655 A1 | 1/2008 | Logvinov et al. |
| 2008/0116877 A1 | 5/2008 | Giubbini et al. |
| 2008/0279321 A1 | 11/2008 | Bickel et al. |
| 2009/0003308 A1 | 1/2009 | Baxley et al. |
| 2009/0135977 A1 | 5/2009 | Sheu |
| 2009/0190704 A1 | 7/2009 | Ben-Ari et al. |

FOREIGN PATENT DOCUMENTS

| | | |
|---|---|---|
| EP | 0866580 A2 | 9/1998 |
| EP | 1178634 A2 | 2/2002 |
| EP | 1501226 A1 | 1/2005 |
| EP | 1538744 A1 | 6/2005 |
| GB | 2329804 A | 3/1999 |
| WO | WO-01/13560 A1 | 2/2001 |
| WO | WO-02/49263 A2 | 6/2002 |
| WO | WO-03/056741 A2 | 7/2003 |
| WO | WO-03/100996 A2 | 12/2003 |
| WO | WO-2004/028105 A1 | 4/2004 |
| WO | WO-2006/130502 A2 | 12/2006 |
| WO | WO-2009/149415 A1 | 12/2009 |

OTHER PUBLICATIONS

U.S. Appl. No. 12/478,679, filed Jun. 4, 2009, Razazian et al.
U.S. Appl. No. 12/478,684, filed Jun. 4, 2009, Umari et al.
U.S. Appl. No. 12/478,689, filed Jun. 4, 2009, Umari et al.
U.S. Appl. No. 12/478,692, filed Jun. 4, 2009, Kamalizad et al.
U.S. Appl. No. 12/478,699, filed Jun. 4, 2009, Razazian et al.
U.S. Appl. No. 12/478,701, filed Jun. 4, 2009, Umari et al.
U.S. Appl. No. 12/795,537, filed Jun. 7, 2010, Razazian et al.
"Office Action Dated Feb. 3, 2011", U.S. Appl. No. 12/478,701.
"Office Action Dated Jan. 28, 2011", U.S. Appl. No. 12/478,699.
"Office Action Datede Mar. 23, 2011", U.S. Appl. No. 12/478,689.
"International Search Report and Written Opinion of the International Searching Authority Dated Oct. 5, 2010", International Application No. PCT/US2010/037835.
International Search Report and Written Opinion of the International Searching Authority Dated Oct. 16, 2009, International Application No. PCT/US2009/046502.
International Search Report and Written Opinion dated Apr. 15, 2010, for related International Application No. PCT/US2009/046519.
INT5200 Single Chip PowerPacket Transceiver, Revision 4, Intellon Corporation, Retrieved from the Internet: URL: http://www.datasheet4u.com/html/I/N/T/INT5200_InTellon.pdf.html,2005.
Chen, Yi-Fu, et al., Baseband Tranceiver Design of a 128-Kbps Power-Line modem for Household Application, IEEE Transactions on Power Delivery, vol. 17, No. 2, Apr. 2002, pp. 338-344.
Gault, Sophie, et al., An OFDMA BAsed Modem for Power Line Communications Over the Low Voltage Distribution Network, IEEE, Power Line Communications and its Applications, 2005 International Symposium, Apr. 6-8, pp. 42-46.
Heo, Kyung L., et al., Design of a High Speed OFDM Modem System for Powerline Communications, IEEE Workshop, Signal Processing Systems (SIPS), Oct. 16-18, 2002, pp. 264-269.
Hsieh, Meng-Han, et al., A Low-Complexity Frame Synchronization and Frequency Offset Compensation Scheme for OFDM Systems Over Fading Channels, IEEE Transactions on Vehicular Technology, vol. 48, No. 5, Sep. 1999, pp. 1596-1609.
Hsu, Christine, et al., Improving HomePlug Power Line Communications With LDPC Coded OFDM, Annual International Telecommunications Energy Conference 28th, IEEE, PI, Sep. 1, 2006, pp. 1-7.
Kwan, Tom, et al., Adaptive Detection and Enhancement of Multiple Sinusoids Using a Cascade IIR Filter, IEEE Transactions on Circuits and Systems, vol. 36, No. 7, Jul. 1989, pp. 937-947.
International Search Report and Written Opinion dated Mar. 17, 2010, for related International Application No. PCT/US2009/046514.
"International Search Report and Written Opinion of the International Searching Authority Dated Oct. 1, 2009", International Application No. PCT/US2009/046512.
"International Search Report and Written Opinion of the International Searching Authority Dated Oct. 1, 2009", International Application No. PCT/US2009/046507.
"International Search Report and Written Opinion of the International Searching Authority Dated Aug. 12, 2009", International Application No. PCT/US2009/046516.
"International Search Report and Written Opinion of the International Searching Authority Dated Jun. 14, 2010", International Application No. PCT/US2009/046509.
"International Search Report and Written Opinion of the International Searching Authority Dated Oct. 15, 2009", International Application No. PCT/US2009/046510.
"Invitation to Pay Additional Fees and Accompanying Partial International Search by the International Searching Authority Dated Aug. 20, 2009", International Application No. PCT/US2009/046510.
"Invitation to Pay Additional Fees and Partial Search Report of the International Searching Authority Dated Apr. 9, 2010", International Application No. PCT/US2009/046509.

(56) References Cited

OTHER PUBLICATIONS

"Invitation to Pay Additional Fees and Partial Search Report of the International Searching Authority Dated Oct. 23, 2009", International Application No. PCT/US2009/046516.

"Invitation to Pay Additional Fees/Partial Search Report of the International Searching Authority Dated Feb. 9, 2010", International Application No. PCT/US2009/046519.

"Office Action Dated Oct. 26, 2010", U.S. Appl. No. 12/478,689.

* cited by examiner

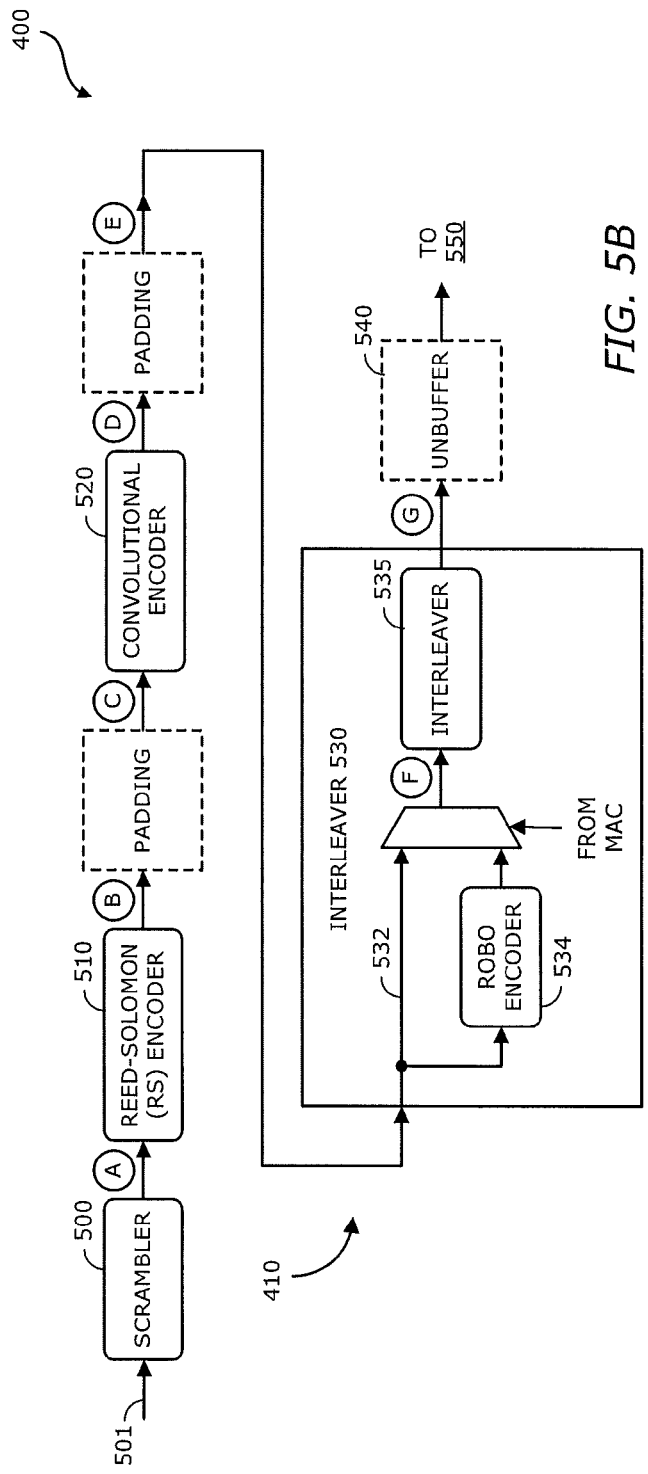
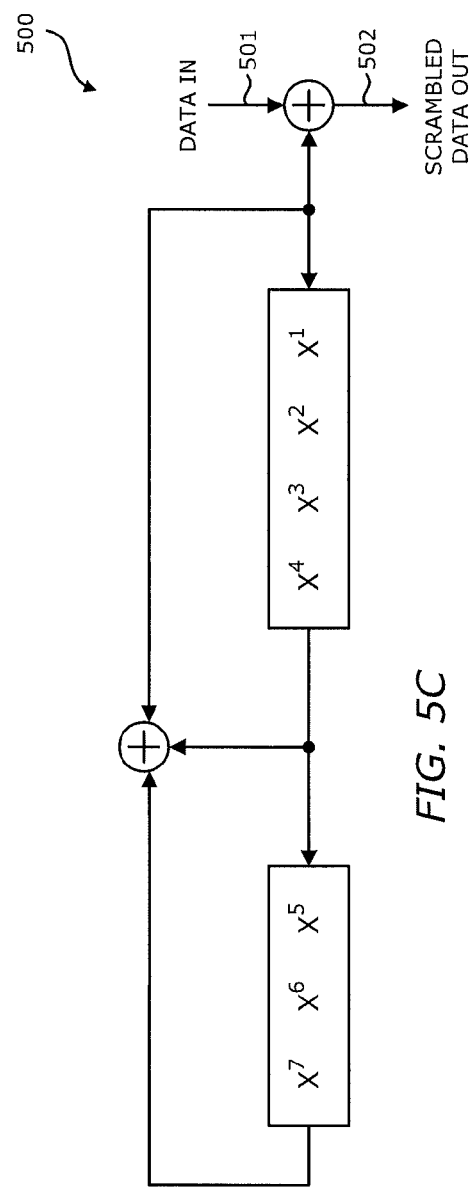
FIG. 5B
FIG. 5C

SYSTEM AND METHOD FOR APPLYING MULTI-TONE OFDM BASED COMMUNICATIONS WITHIN A PRESCRIBED FREQUENCY RANGE

CROSS-REFERENCE TO RELATED APPLICATIONS

This application is a continuation of U.S. patent application Ser. No. 13/680,259 (U.S. Pat. No. 8,780,691), filed Nov. 19, 2012, which is a continuation of U.S. patent application Ser. No. 12/478,618 (U.S. Pat. No. 8,315,152), filed Jun. 4, 2009. This application claims the benefit of U.S. Provisional Application No. 61/059,684, filed on Jun. 6, 2008. The disclosures of the above applications are incorporated herein by reference in its their entirety.

FIELD

Embodiments of the invention generally relate to a field of communications over a power line. More specifically, one embodiment of the invention relates to a system and method for applying multi-tone, orthogonal frequency division multiplexing (OFDM) based communications over a prescribed frequency region.

BACKGROUND

For many years, both direct current (DC) and alternating current (AC) power lines have been used in order to transfer data from one device to another. Recently, there has been a growing need for new data transmission services and applications that are more reliable and support higher data rates over these power lines. For instance, remote metering, smart grids, industrial and home automation are merely some of the upcoming applications that are currently using power lines to support data communications and greater use of these power lines is expected.

One primary disadvantage in using power lines for data transfer is that power lines are hostile environments. In fact, communication channels supported by these AC power lines tend to experience severe non-linear behavior. In particular, channel characteristics and parameters may vary due to changes in frequency, location, time and even the type of equipment deployed. As an example, the impedance of a power line may appear to be 1-2 ohms (Ω), but as the frequency of signaling applied to the power line increases, the impedance of the power line also increases. This increased impedance causes increased signal noise that may hamper proper detection of the data at an intended destination.

FIG. 1 illustrates an exemplary noise power distribution 100 with frequency bands 110-112 supported by European (CELENEC), United States (FCC) and Japan (ARIB) power line standards respectively, as outlined in Table A.

TABLE A

| STANDARDS | LOW FREQ (KHz) | HIGH FREQ (KHz) |
| --- | --- | --- |
| FCC | 10 | 480 |
| ARIB | 10 | 450 |
| CELENEC A | 9 | 95 |
| CELENEC B | 95 | 125 |
| CELENEC C | 125 | 140 |
| CELENEC B, C | 95 | 140 |

As illustrated in FIG. 1, a low frequency region from three kilohertz (3 kHz) to 500 kHz is especially susceptible to interference such as narrowband interference and/or intersymbol interference (ISI), which may occur if orthogonal frequency division multiplexing (OFDM) is used as the selected data transmission scheme.

SUMMARY

OFDM is a multi-carrier modulation scheme that subdivides the available frequency spectrum into a number of narrowband channels (e.g., around 100 channels). The carriers for each channel may be spaced much closer together than Frequency Division Multiplexing (FDM) for example, because each carrier is configured to be orthogonal to its adjacent carriers. This orthogonal relationship may be achieved by setting each carrier to have an integer number of cycles over a symbol period. Hence, theoretically, there is no interference between the carriers themselves, albeit interference caused by environmental conditions may exist.

Besides interference, the low frequency region is highly susceptible to impulsive noise and group delay. "Impulsive noise" is characterized as a short peak pulse substantially less than one second (e.g., a few microseconds) and with a sharp rise time above the continuous noise level experienced by the signal. "Group delay" is a measure of the rate of change of the phase with respect to frequency. As an effect of non-constant group delay, phase distortion will occur and may interfere with accurate data recovery.

Prior power line communications have virtually avoided using OFDM-based communication techniques within the lower frequency region. One reason for such avoidance can be ascertain by review of the noise power distribution of FIG. 1. Between 10 kHz and 148 kHz (Celenec bands shown as region A 110), the effects of noise on an input signal of a given frequency level is about 10-30 decibels (dB) stronger than the noise experienced by signals at approximately 150 kHz as represented in region B 120. Moreover, the channel frequency response varies drastically within the region between 10 kHz-150 kHz, resulting in severe amplitude and phase distortion.

BRIEF DESCRIPTION OF THE DRAWINGS

Features and advantages of embodiments of the invention will become apparent from the following detailed description in which:

FIGS. 5A-5H illustrate more detailed embodiments of a transmitter of the networked device.

DETAILED DESCRIPTION

Embodiments of the invention set forth in the following detailed description generally relate to methods, apparatus, software, and systems for applying multi-tone orthogonal frequency division multiplexing (OFDM) based communications within a prescribed frequency band such as between 10 kHz and 600 kHz. According to one embodiment of the invention, the prescribed frequency band may involve frequencies less than 500 kHz and is programmable. For instance, the prescribed frequency band may be within 3 kHz-148 kHz (Celenec, European standard); 10 kHz-480 kHz (FCC, United States standard); 10 kHz-450 kHz (ARIB, Japanese standard) or the like. Of course, the invention may be applicable to chosen frequency bands greater than 500 kHz.

Of course, it is contemplated that a combination of a feedback analog automatic gain control (AGC) followed by a digital AGC, tone mapping module and adaptive notching module (described below) may be adapted to handle communications through a HV/LV transformer.

In the following description, certain terminology is used to describe certain features of the invention. For example, the terms "logic" and "module" broadly represent hardware, software, firmware or any combination thereof. The term "power line" generally represents a medium adapted to carry direct current (DC) or alternating current (AC).

Figure 1:
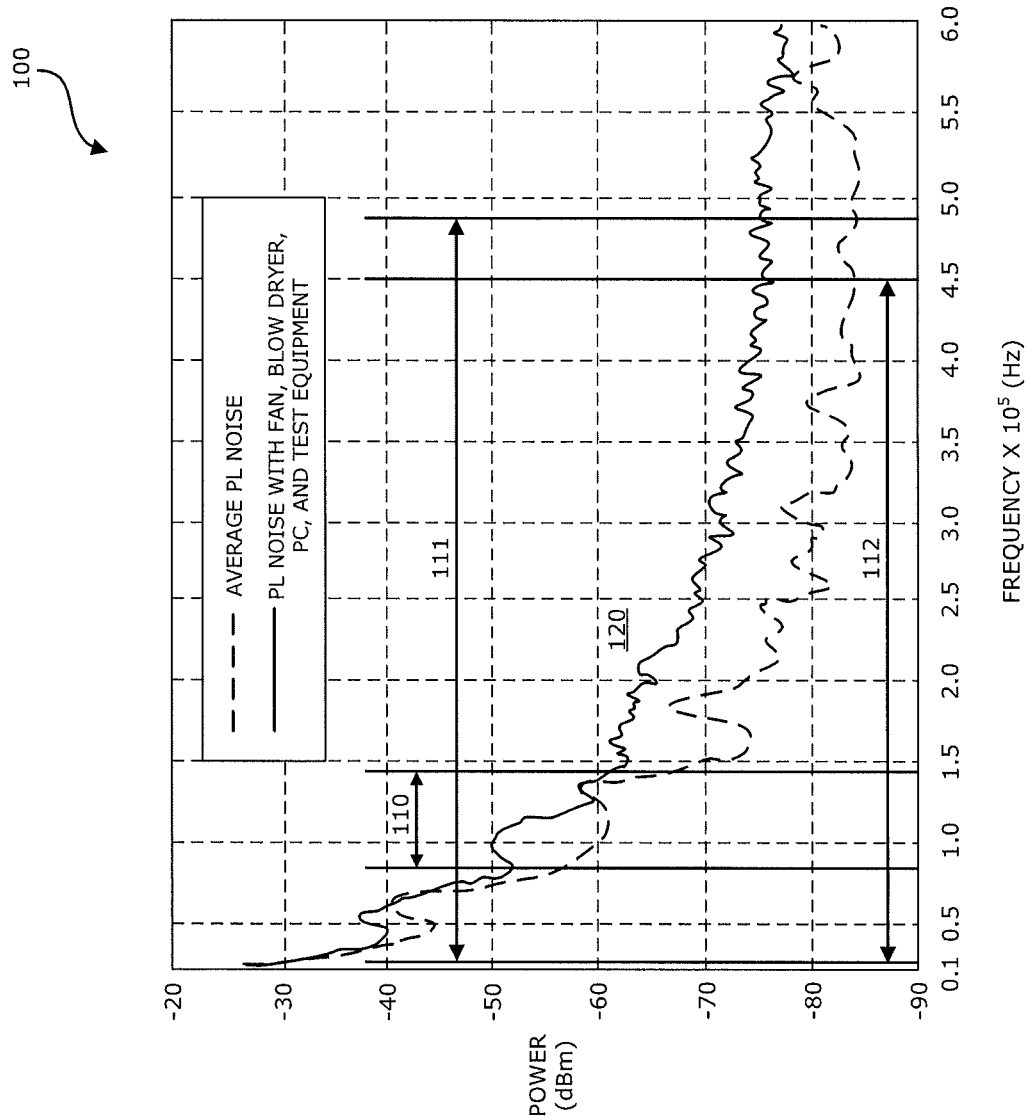
FIG. 1 is an exemplary depiction of noise power distribution over a power line.
Figure 2A:
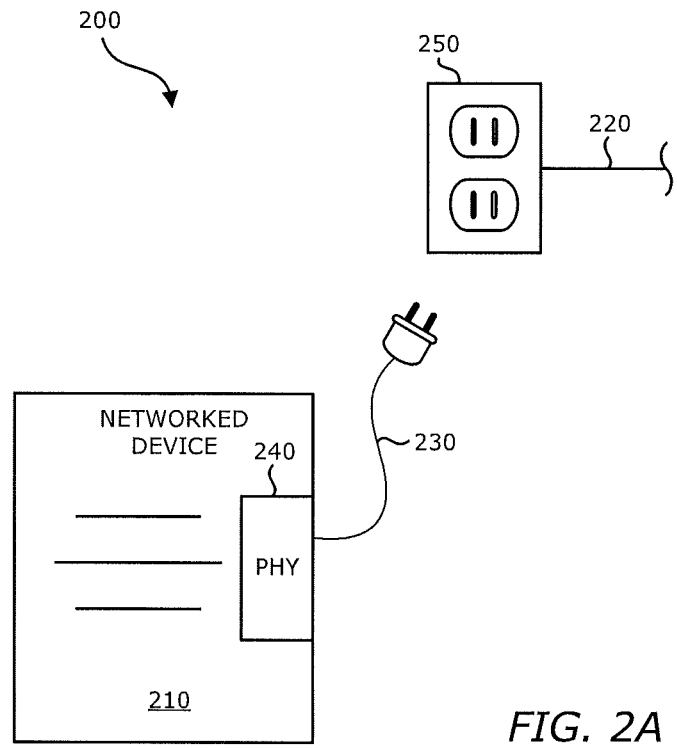
FIGS. 2A and 2B are exemplary block diagrams of a networked device utilizing power lines for data transfer.

Referring now to FIG. 2A, a general embodiment of a network system 200 adapted to support multi-tone OFDM base communications is shown. Herein, a networked device 210 is connected to a power line 220 via a power cord 230. In general, "networked device" 210 is any equipment that is capable of transmitting and/or receiving information over power line 220. Examples of different types of networked devices include, but are not limited or restricted to a computer, a router, an access point (AP), a wireless meter, a networked appliance, an adapter, or any device supporting capability to a wired or wireless network.

According to one embodiment of the invention, networked device 200 includes Physical Layer (PHY) logic 240 that is adapted to process data for transmission over power cord 230 to power line 220. PHY logic 240 comprises circuitry and perhaps software to support electrical and mechanical functionality with power line 220, where these electrical or mechanical connections provide an interface to format signals for transmission or receipt over power lines 220. Such functionality may include, but is not limited or restricted to digital-to-analog conversion, analog-to-digital conversion, modulation, and/or error correction. This functionality is described in further detail with respect to the receiver and transmitter modules set forth in FIGS. 4-6.

Figure 3:
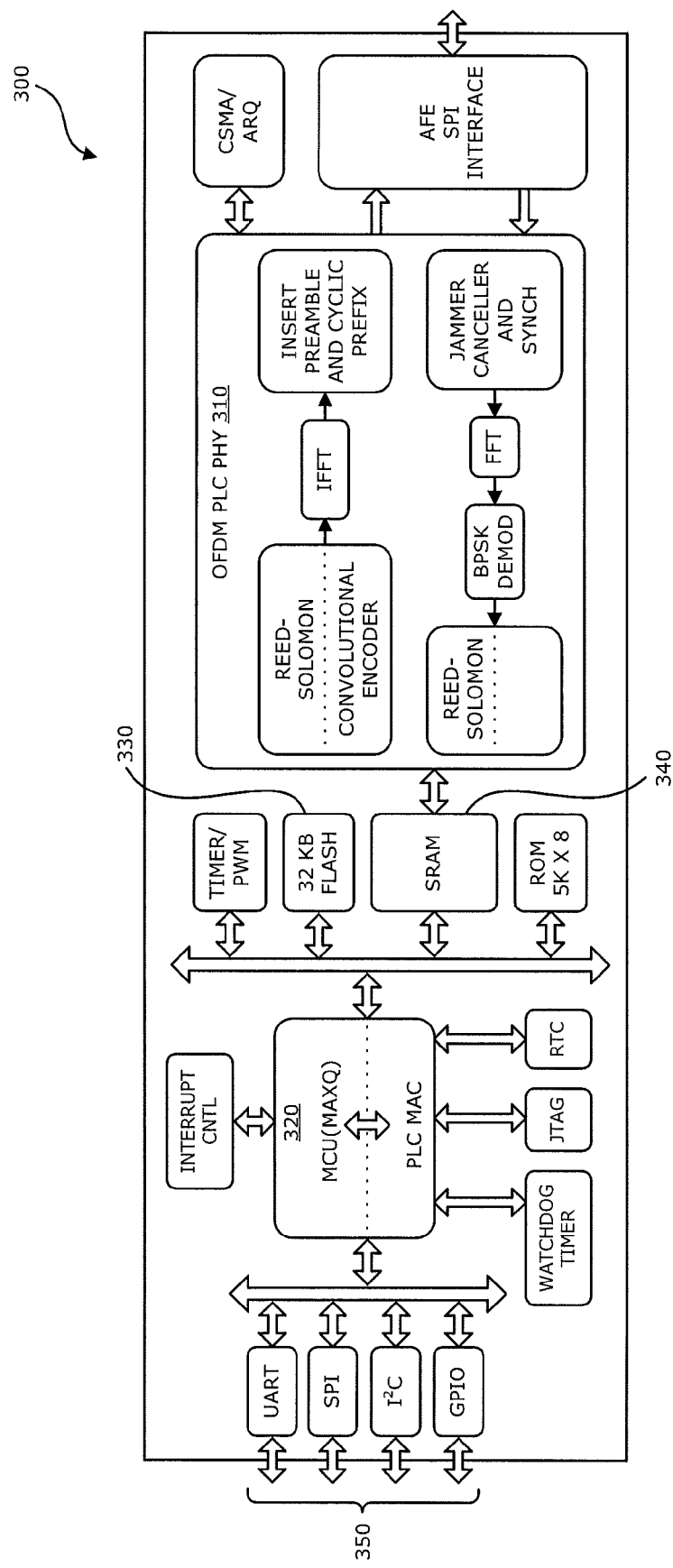
FIG. 3 is an exemplary block diagram of an integrated circuit that controls communications over a power line of FIG. 2A and/or FIG. 2B.

According to one embodiment of the invention, PHY circuitry 240 may include circuitry, such as an OFDM Power Line Communication Physical Layer (OFDM PLC PHY) circuitry 310 of FIG. 3, which enables network connectivity over power lines 220 via power cord 230. Power cord 230 includes a two-prong, or three-prong plug that is placed into a wall socket 250, which is connected to an end of power line 220.

Figure 2B:
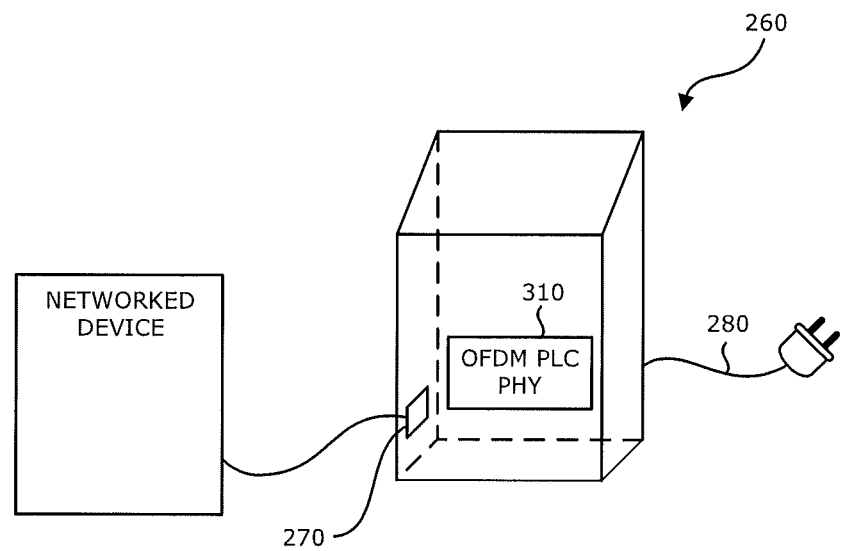

It is contemplated that networked device 200 may be configured as an adapter 260 in communication with a device (e.g., computer, AP, etc.) that is to be connected to the power line network but does not feature the necessary PHY circuitry. As shown in FIG. 2B, adapter 260 is implemented with OFDM PLC PHY circuitry 310 and operates as an intermediary between the device and power line 220. For this implementation, it is contemplated that adapter 260 includes a connector 270 that enables communications with the device and a power cord 280 that establishes a connection with power line 220. Connector 270 may include any serial and/or parallel port such as, for example, a RJ-11 jack, Universal Serial Bus (USB) port, or the like.

Referring now to FIG. 3, an exemplary embodiment of an integrated circuit that controls communications over power line 220 of FIGS. 2A and 2B is shown. Herein, a combination of physical (PHY) and media access control (MAC) layers is implemented within a single integrated circuit 300. Herein, the PHY layer, namely OFDM PLC PHY circuitry 310, uses OFDM technology with DBPSK modulation and forward error correction (FEC) to provide robust communication in the presence of narrowband interference, group delay, jammer signals, impulsive noise, and frequency-selective attenuations. OFDM PLC PHY circuitry 310 includes a transmitter and a receiver as described below.

As shown, OFDM PLC PHY circuitry 310 is controlled by a microcontroller 320 (e.g., 16-bit RISC MAXQ® microcontroller) that is placed on-chip as well. Moreover, integrated circuit 300 further includes flash memory 330, static random access memory 340, and serial interfaces 350 (e.g., universal asynchronous receiver/transmitter "UART", System Packet Interface "SPI", Inter-Integrated Circuit "I²C") for communication among devices on the power line network.

Figure 4:
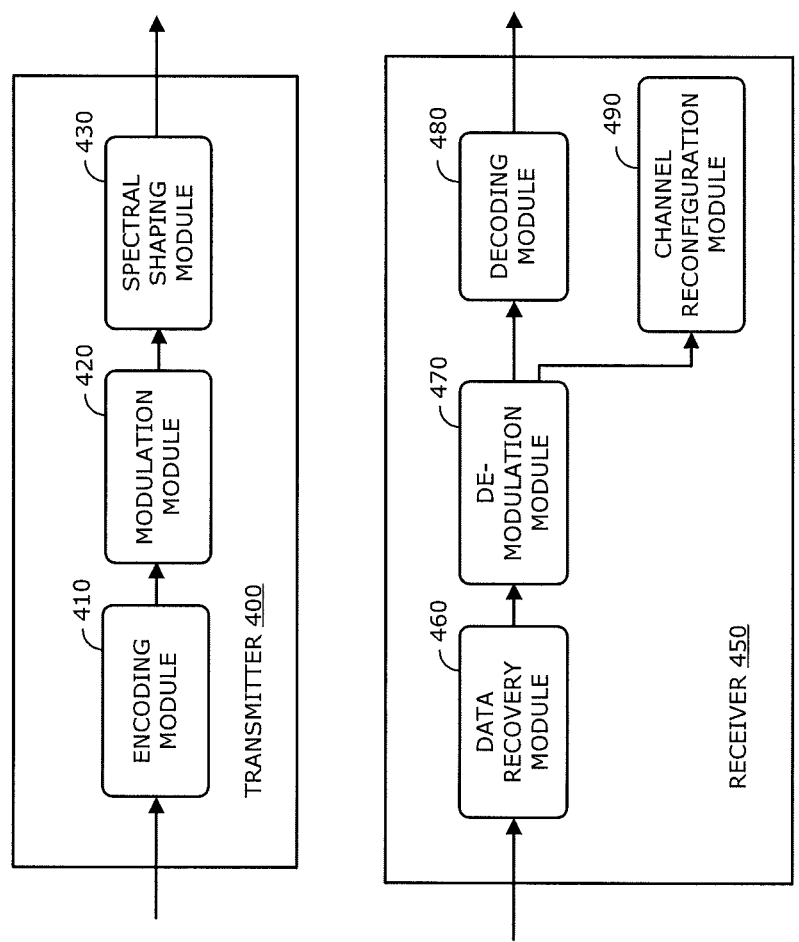
FIG. 4 illustrates an exemplary embodiment of transmitter/receiver combination of the networked device as described in FIG. 2A and/or FIG. 2B.

Referring to FIG. 4, an exemplary embodiment of a transmitter 400 integrated within OFDM PHY circuitry 310 and adapted for communications with an OFDM receiver is shown. Herein, according to this embodiment of the invention, transmitter 400 comprises a plurality of modules including an encoding module 410, a modulation module 420, and a spectral shaping module 430.

Figure 5A:
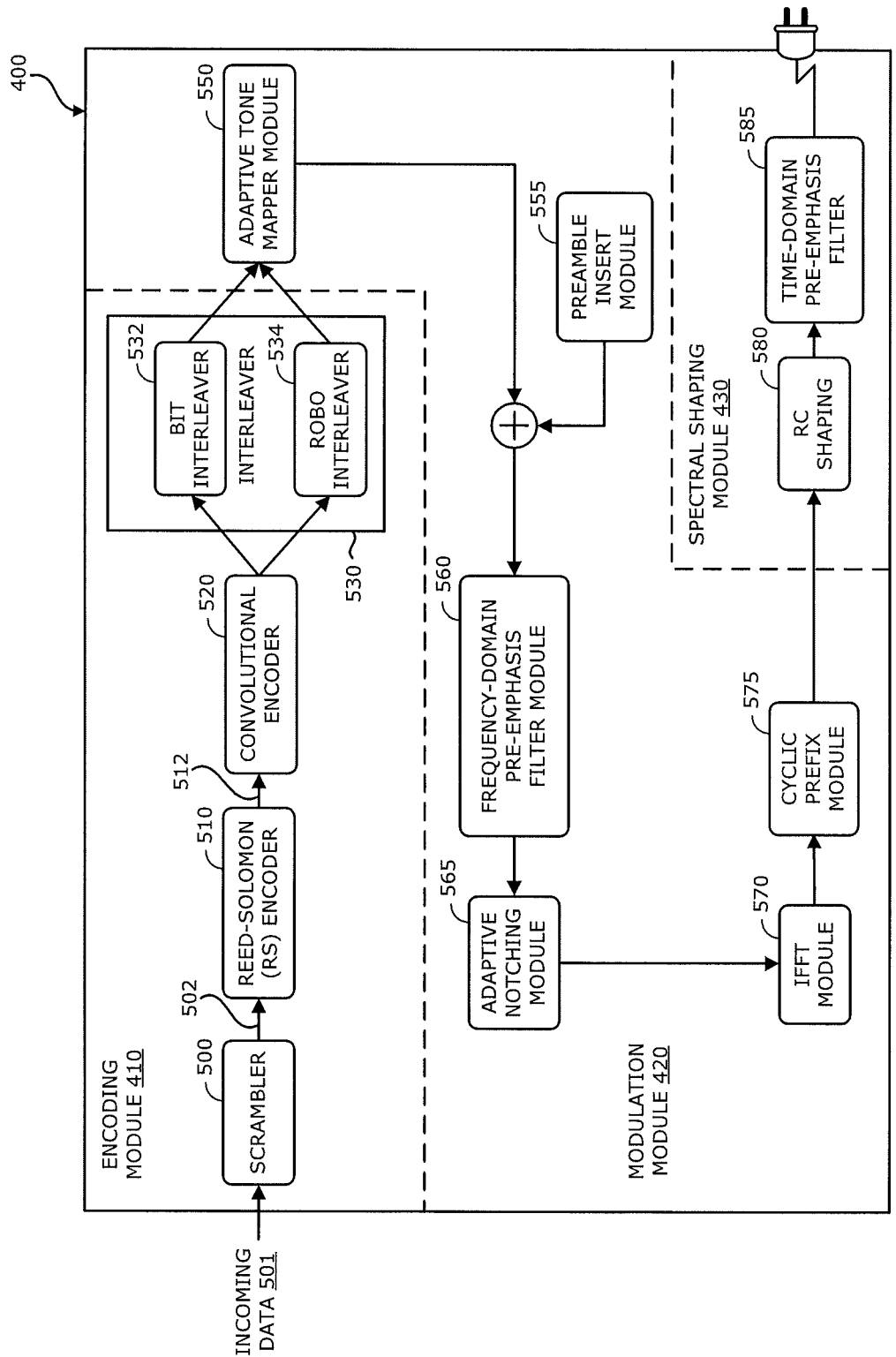

As shown in FIGS. 5A and 5B, an exemplary embodiment of transmitter 400, especially encoding module 410, is shown. In general, a functionality of encoding module 410 is to randomize the incoming data and to insert error correction data into the transmitted signal. Herein, for this embodiment of the invention, encoding module 410 comprises a scrambler 500, a Reed-Solomon encoder 510, a convolutional encoder 520 and an interleaver sub-system 530 that may operate in either Normal mode or Robust (ROBO) mode, where interleaver sub-system 530 performs repetitive encoding when operating in ROBO mode. In other words, ROBO mode provides extra redundancy to facilitate communications in frequency selective, severely attenuated channels. Optional padding may be performed by encoding module 410.

Transmitter 400 is adapted to receive its input bits in a packet from the Media Access (MAC) Layer. Encoding module 410 may add parity bits to the data and the packet increases in size as it passes through encoding module 410. At the end of encoding module 410, the final packet may be segmented into small packet(s) by "Un-Buffer" block 540 of FIG. 5B so that each small packet may be fitted into one OFDM symbol. The size of this small packet depends on the number of carriers used in each OFDM symbol.

For example, in FCC band, the packet size becomes equal to 100 bits. In order to understand the size of data as well as signal dimensions at each various points in the transmitter 400, the number of bits carried by a packet (e.g., PHY frame) may be obtained as set forth by equation (1):

$$N_F = N_G = Ncarr \times Ns \qquad (1)$$

Herein, "$N_F$" and "$N_G$" represent the size of packet (signal) at points (F) and (G) of FIG. 5B, respectively. Where "Ncarr" is the number of carriers in each OFDM symbol and "Ns" is the number of symbols per PHY frame. Note that the interleaver does not change the size of packet. The number of bits at point (E) may be computed by equation (2):

$$N_E = N_F \times R \qquad (2)$$

Herein, the value "R" may be one "1" for Normal mode and a fraction based on repetition level (e.g., "¼") for ROBO Mode. In order to determine M, the number of zeros that may be needed to pad at the output of convolutional encoder 520, the maximum number of Reed-Solomon (RS) bytes needs to be computed. The maximum number of RS bytes (MaxRSbytes) at the output of RS encoder 510 can be obtained as shown in equation (3):

$$\text{MaxRSbytes}=\text{floor}((N_E \times \text{CCRate}-\text{CCZeroTail})/8) \quad (3)$$

Where "CCRate" and "CCZeroTail" are the convolutional code rate (½) and the number of zeros to be added to the input of convolutional encoder 520 (to terminate the states to zero state), respectively. The denominator "8" refers to the length of each RS word that is one byte. Therefore, the value of "M" may be obtained by (see Table 1 below):

$$M=N_E-((\text{MaxRSbytes} \times 8)+6) \times 2 \quad (4)$$

And the number of bits at point (D), (C) and (B) now may be calculated by:

$$N_D=N_E-M$$

$$N_C=N_D/2$$

$$N_B=N_C-6$$

TABLE 1 # of zeroes padded after convolutional encoder

|  | ROBO (bits) | Normal (bits) |
| --- | --- | --- |
| FCC | M = 12 | M = 4 |
| ARIB | M = 6 | M = 12 |
| CELENEC A | M = 12 | M = 4 |
| CELENEC B | M = 4 | M = 4 |
| CELENEC C | M = 4 | M = 4 |
| CELENEC B, C | M = 4 | M = 4 |

Finally, considering the fact the number of parity bytes in RS code may be equal to 8, the packet size delivered by MAC to the physical layer may be given by:

$$N_A=(N_B-8) \times 8$$

The input packet to the physical (PHY) layer for various band and both normal and ROBO modes may be summarized in Table 2 below.

TABLE 2

Packet size delivered by MAC layer to PHY layer

|  | ROBO (bits) | Normal (bits) |
| --- | --- | --- |
| FCC | 424 | 1928 |
| ARIB | 392 | 1784 |
| CELENEC A | 304 | 1448 |
| CELENEC B | 168 | 888 |
| CELENEC C | 168 | 888 |
| CELENEC BC | 288 | 1368 |

Referring still to FIGS. 5A and 5B, scrambler 500 randomly distributes the incoming data. For instance, according to one embodiment of the invention, incoming data 501 may undergo an exclusive-OR (XOR) operation with a repeating pseudo-random sequence to produced scrambled data 502 as shown in FIG. 5C. Herein, according to one embodiment of the invention, a generator polynomial $S(x)=x^7+x^4+1$ is used where the bits in scrambler 500 are initialized to all ones at the start of processing each PHY frame.

Thereafter, scrambled data 502 is routed to a first error correction scheme, namely a Reed-Solomon (RS) encoder 510. Read-Solomon encoder 510 is responsible for recovering data destroyed by impulsive noise. Hence, RS encoder 510 recovers data associated with a tone experiencing impulsive noise and outputs such data 511 to convolutional encoder 520.

Herein, according to one embodiment of the invention, data from scrambler 500 may be encoded by RS encoder 510 created by shortening the RS code (255,247, t=4) and (255, 239, t=8). The "RS symbol word length," namely the size of the data words used in the Reed-Solomon block, may be fixed at 8-bits. The value of t (number of word errors that can be corrected) can be either 4 or 8 for different standards. For CENELEC B&C and ROBO, the RS parity of 8-bytes (corresponding to t=4) should be used. The number of parity words in a RS-block is thus "2t" words.

The number of non-parity data words (bytes) in Reed-Solomon block may be provided in Table 3 below. The first bit in time from scrambler 500 may become the most significant bit "MSB" of that symbol. Each RS encoder input block (e.g., 247 symbols) is conceptually formed by one or more fill symbols ("00000000") followed by the message symbols. Output of RS encoder 510 (with fill symbols discarded) may proceed in time from first message symbol to last message symbol followed by parity symbols, with each symbol shifted out most significant bit first.

$$\text{Code Generator Polynomial } g(x)=(x-\alpha^1)(x-\alpha^2)(x-\alpha^3) \ldots (x-\alpha^8)$$

$$\text{Field Generator Polynomial: } p(x)=x^8+x^4+x^3+x^2+1 (435 \text{ octal})$$

TABLE 3

RS encoder input/output packet size

|  | Normal Mode $N_A/N_B$ (Bytes) | ROBO Mode $N_A/N_B$ (Bytes) |
| --- | --- | --- |
| FCC | 241/249 | 53/61 |
| ARIB | 223/231 | 49/57 |
| CENELEC A | 181/189 | 38/46 |
| CENELEC BC | 171/179 | 36/44 |
| CENELEC B | 111/119 | 21/29 |
| CENELEC C | 111/119 | 21/29 |

The representation of $\alpha^0$ is "00000001", where the left most bit of this RS symbol is the MSB and is first in time from scrambler 500 and is the first in time out of RS encoder 510.

Next, convolutional encoder 520 is responsible for recovering those portions of data 511 that are affected by white noise present within data 511 due to Gaussian noise from the environment. This white noise causes degradation of the data associated with each tone. While the degradation of the data cannot be eliminated, its effect can be mitigated through forward error correction (FEC) techniques that are performed by convolutional encoder 520.

Figure 5D:
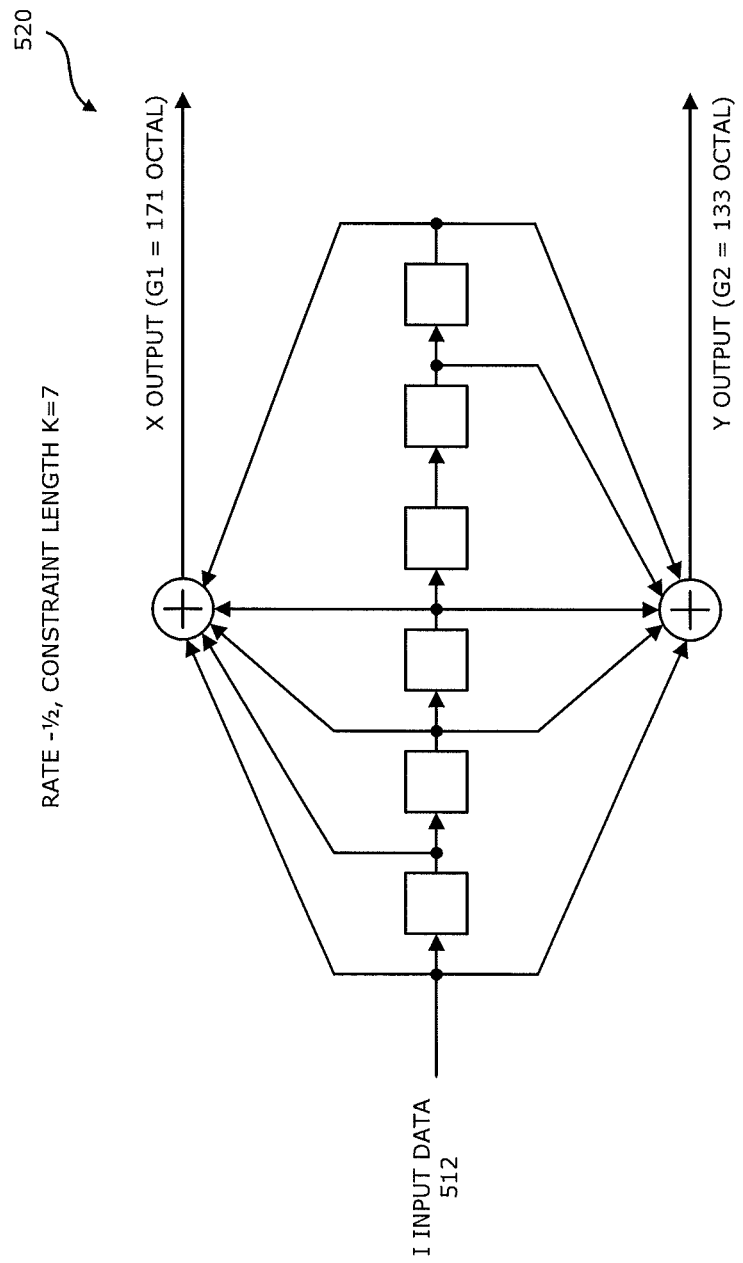

Herein, according to one embodiment of the invention, the bit stream at the output of the Reed-Solomon block may be encoded with a standard rate=½, K=7 convolutional encoder 520. The tap connections are defined as x=0b1111001 and y=0b1011011, as shown in FIG. 5D.

When the last bit of data to convolutional encoder 520 has been received, convolutional encoder 520 inserts six tail bits, which may be required to return convolutional encoder 520 to the "zero state". This may improve the error probability of the convolutional decoder, which relies on future bits when decoding. The tail bits may be defined as six zeros. The number of bits at the input and the output of convolutional encoder 520 may be given in Table 4.

TABLE 4

Convolutional encoder input/output packet sizes

|  | Normal Mode $N_A/N_B$ (bits) | ROBO Mode $N_A/N_B$ (bits) |
|---|---|---|
| FCC | 1998/3996 | 494/988 |
| ARIB | 1854/3708 | 462/924 |
| CENELEC A | 1518/3036 | 374/748 |
| CENELEC BC | 1438/2876 | 358/716 |
| CENELEC B | 958/1916 | 238/476 |
| CENELEC C | 958/1916 | 238/476 |

Next, interleaver sub-system 530 is used to intelligently randomize the data in frequency (subcarriers) and time in order to achieve frequency and time diversity. In other words, data may be repositioned in different frequency channels and even in different symbols (OFDM). Interleaver sub-system 530 generally is adapted to operate in two different modes: Normal mode 532 and Robust (or ROBO) mode 534. In Normal mode, interleaver sub-system 530 randomizes the data in frequency and time. In ROBO mode, however, interleaver sub-system 530 not only randomizes the data in frequency and time, but also facilitates communications over a degraded channel by reducing the data rate and performing repetition coding.

This repetition coding involves the operation of repeating the data bits from convolutional encoder 520 multiple times (e.g., four times) and statistically placing these bits at different frequencies and within different symbols in order to increase reliability. Whether interleaver sub-system 530 operates in Normal mode or ROBO mode is controlled by microcontroller 320 of FIG. 3 based on signaling from a corresponding receiver that is currently in communications with transmitter 400. Such signaling is the result of the channel estimation module of the receiver measuring the SNR of the channel and using this information to decide the mode of operation. Thereafter, the receiver communicates this information for receipt by transmitter 400.

Figure 5E:
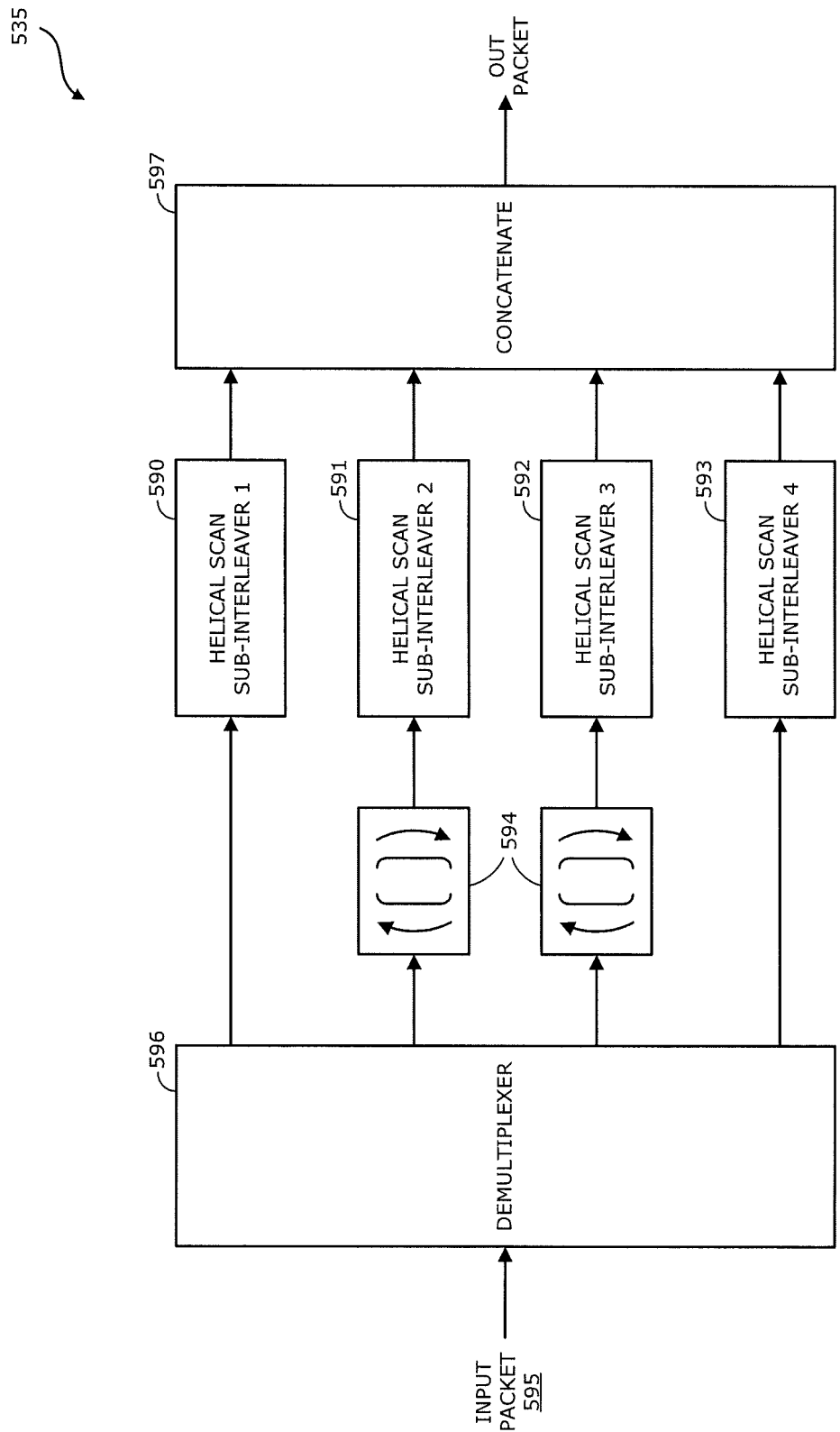

Herein, according to one embodiment of the invention, an interleaver 535 being part of interleaver sub-system 530 may be used for both Normal and ROBO modes. As shown in FIG. 5E, interleaver 535 comprises four sub-interleavers 590, 591, 592 and 593. All sub-interleavers 590-593 may be the same and have same architectures. A flipping block 594 precedes sub-interleavers 591 and 592. This means that packets provided along these two branches may be written backward from the end of their inputs to the beginning. The segmentation of input packet 595 into a plurality of sub-packets that are transmitted along each branch is performed by a demultiplexer 596. Demultiplexer 596 may be different for each mode (Normal and ROBO modes) as described below.

A. Demultiplexer for Normal Mode

The input data bits may be applied to each branch alternatively. This means that the first data bit may be applied to first sub-interleaver 590; the second bit may be applied to second sub-interleaver 591, and so on.

B. Demultiplexer for ROBO Mode

Figure 5F:
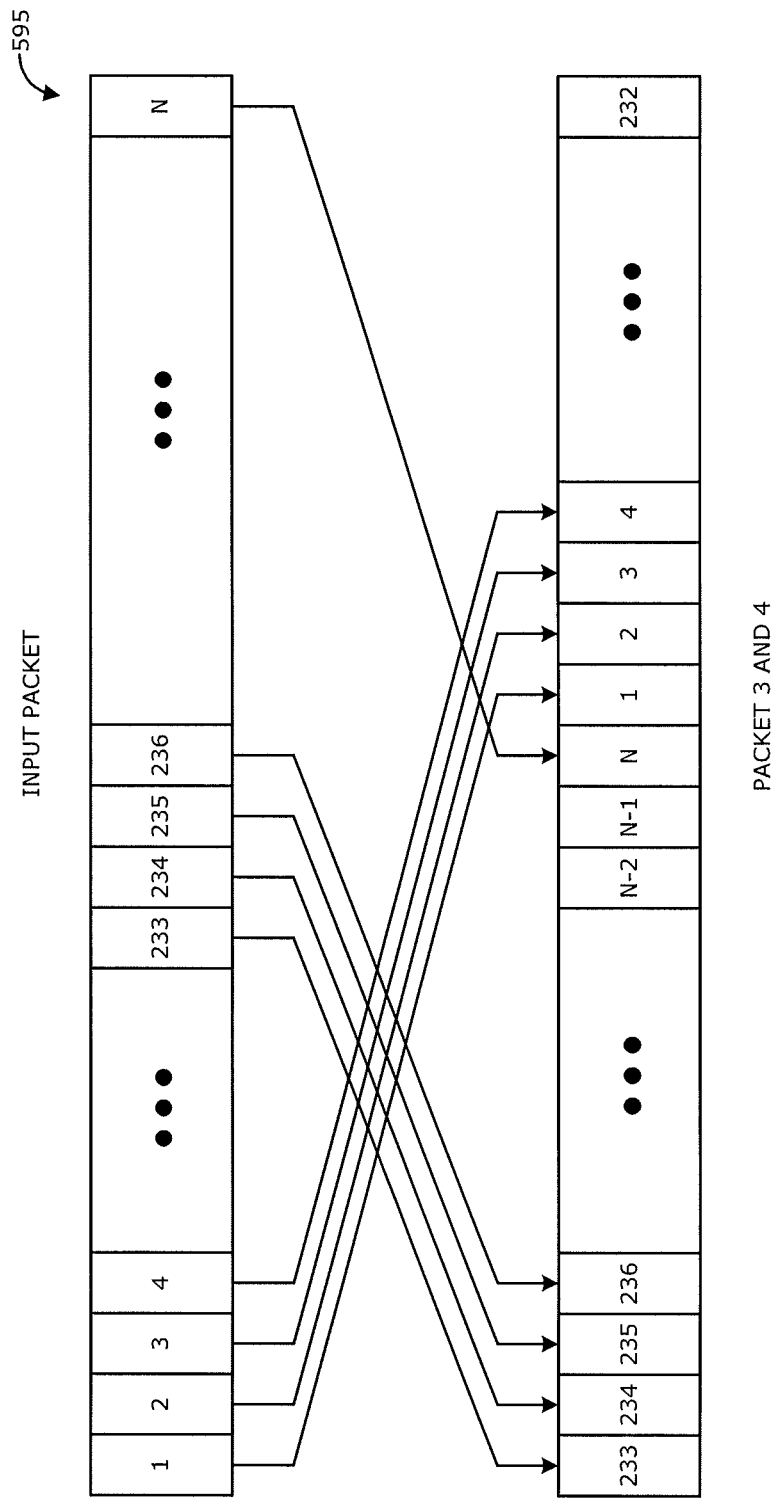

As shown in FIG. 5F, the input packet may be repeated four times (hereby the repeat code (by 4) is set). However, the data for the third and fourth branch 592 and 593 may be read from bit number 233 (assuming the first number is 1) and the reading is wrapped around at the end of the packet. This means that when the end of packet is reached, it may start the reading from the beginning and stops at bit number 232. This method is graphically illustrated in FIG. 5F.

C. Helical Scan Interleaver

The helical scan interleaver (sub-interleaver 590-593) may write the input bits row-by-row in a matrix and read them diagonal wise. The number of rows in each sub-interleaver 590-593 may be equal to 10 and the number of columns may be computed as shown below and illustrated in Table 5:

Number of Columns=Number of symbols*Number of carries/40

TABLE 5 interleaver rows and columns for bands

|  | No. of Rows | No. of Columns |
|---|---|---|
| FCC | 10 | 100 |
| ARIB | 10 | 93 |
| CENELEC A | 10 | 76 |
| CENELEC B | 10 | 48 |
| CENELEC C | 10 | 48 |
| CENELEC BC | 10 | 72 |

Figure 5G:
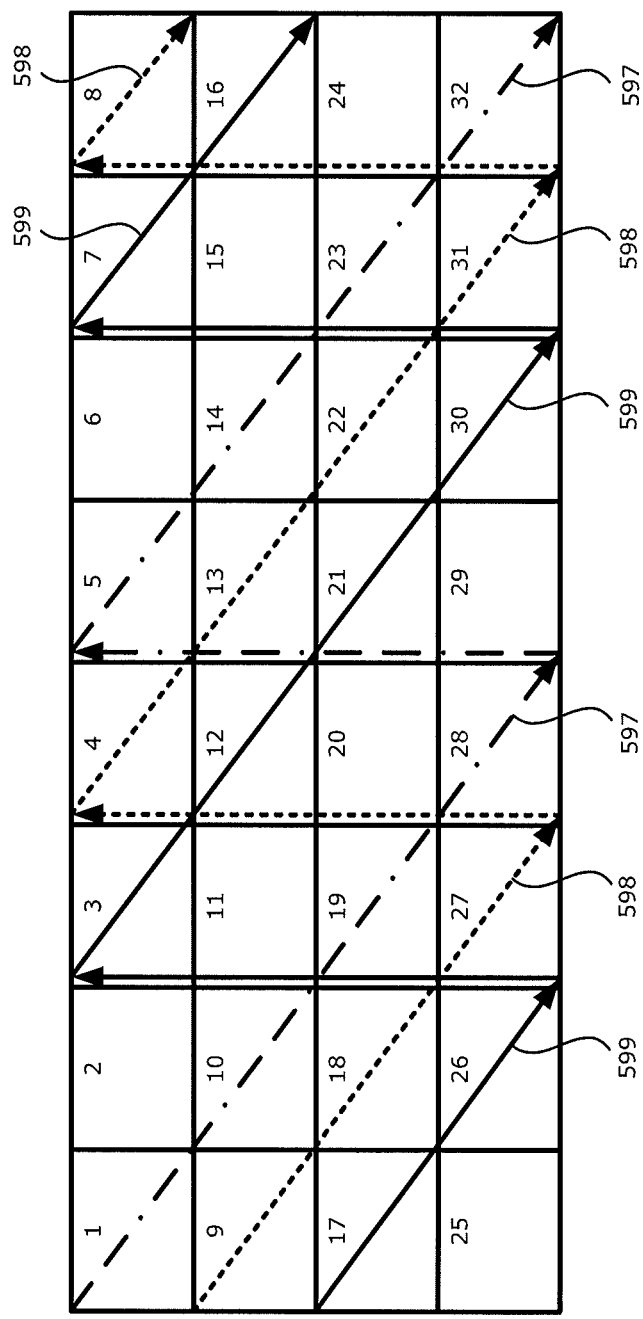

For illustrative purposes, as shown in FIG. 5G, for the input array [1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32] where the data is written row by row. Reading diagonal wise, starting from index position (0,0), going through traces 597, 598, 599, the output array may be given by: [1, 10, 19, 28, 5, 14, 23, 32, 9, 18, 27, 4, 13, 22, 31, 8, 17, 26, 3, 12, 21, 30, 7, 16, 25, 2, 11, 20, 29, 6, 15, 24].

Note that the input packet to the second and third sub-interleavers 591 and 592 of FIG. 5E may be flipped. In other words, the packet may be written from the end of array. The outputs of sub-interleavers 590-593 may be finally concatenated by logic 597, which means that the whole output packet of the first interleaver 590 may be sent first, the whole output packet of the second interleaver 591 may be sent second, and so on so forth (e.g., bit by bit alternation may not be applied to the output). An exemplary C code to implement the interleaver is given below:

```
R = 10;   //Number of rows
C = Ns * Ncarr / 40; //Number of columns
i=0;
//writing into the memory row by row
for (n=0;n<R;n++)
    {
        for (m=0;m<C;m++)
        {
            a[n][m]= x[i]; // x is the input array
            i = i + 1;
        }
    }
//reading the memory diagonal wise
i=0;
for (n=0;n<R;n++)
{
    k = n;
    for (m = 0;m < C; m++)
    {
        x[i] = a[k][m];
        k = (k + 1) % R;
        i = i +1;} }
```

Referring to FIGS. 4 and 5A, modulation module 420 comprises an adaptive tone mapping module 550, preamble insert module 555, a frequency-domain pre-emphasis filtering module 560, an adaptive notching module 565, an inverse fast fourier transform (IFFT) module 570 and a cyclic prefix module 575. Herein, adaptive tone mapping module 550 receives packets of data from interleaver 530 and uses PSK modulation to map bits of data to a corresponding analog frequency.

Thereafter, according to one embodiment, preamble insertion module 555 is responsible for inserting a preamble into the start of each PHY frame. The preamble is used in transmissions to identify that the frame has arrived and the type of modulation conducted on the data within the frame.

It is contemplated that every time a signal is transmitted over a power line, the signal will experience some attenuation, especially at the higher frequencies. Hence, in order to compensate for attenuation caused by channel characteristics, frequency-domain pre-emphasis filter module 560 is adapted to multiply complex elements received from adaptive tone mapping module 550 (e.g., complex frequency domain samples of an OFDM symbol) with corresponding filter coefficient values. Each of the filter coefficient values represents attenuation for one of the tones ranging from 0 dB up to 12 dB or higher, and such filter coefficient values can be dynamic or static in nature.

Figure 5H:
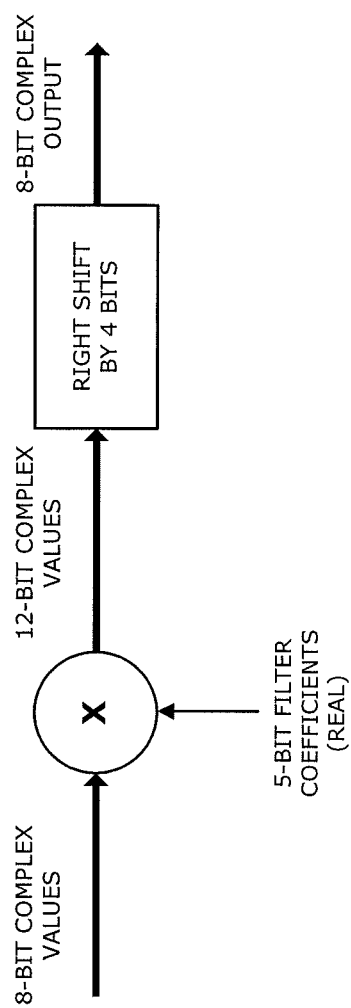

More specifically, frequency-domain pre-emphasis filter module 560 may include a multiplexer that is adapted to multiply the complex frequency domain samples of an OFDM symbol with 128 real filter coefficients, then conduct four (4) right shifts at the output. According to one embodiment of the invention, the filter coefficients are 5-bits representing unsigned values from 0 h to 10 h, and the filter coefficients is not be allowed to have values larger than 10 h. Of course, in other embodiments, other bit sizes may be used. For this embodiment, the filter multiplies the first 128 frequency-domain complex samples of an OFDM symbol with the 128 real coefficients of the filter. The rest of the 128 frequency-domain samples of the OFDM symbol typically are set to zero and are not be multiplied by the filter coefficients. As shown in FIG. 5H, input complex samples may be 8 bits each while the filter coefficients may be 5 unsigned bits each. Since the maximum allowed value of any filter coefficients may be 10h, the output of the multiplication may be 12 bits (not 13 bits). The output may then be right shifted by 4 to get a final output of 8 bits that may be used as input to the IFFT.

The filter coefficient values may vary from 0 to 16, and since four (4) right shifts are performed at the output. Hence, frequency-domain pre-emphasis filter module 560 may provide the following attenuation for any of the 128 carriers:

| Scaling factor | attenuation in dB |
| --- | --- |
| 16/16 | 0 dB |
| 15/16 | −0.53 dB |
| 14/16 | −1.16 dB |
| 13/16 | −1.8 dB |
| 12/16 | −2.5 dB |
| 11/16 | −3.25 dB |
| 10/16 | −4 dB |
| 9/16 | −5 dB |
| 8/16 | −6 dB |
| 7/16 | −7.2 dB |
| 6/16 | −8.5 dB |
| 5/16 | −10.1 dB |
| 4/16 | −12 dB |
| 3/16 | −14.5 dB |
| 2/16 | −18 dB |
| 1/16 | −24 dB |
| 0/16 | −infinite |

Figure 7:
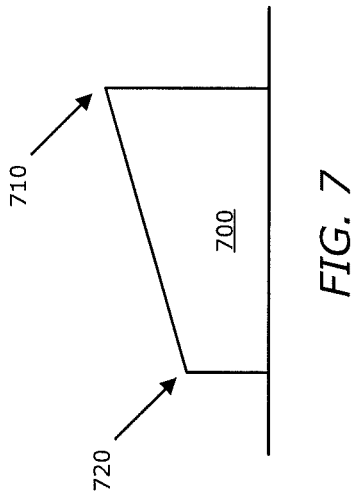
FIG. 7 illustrates the operations of a frequency-domain pre-emphasis filter implemented within the transmitter of the networked device of FIG. 5A.

For instance, as an illustrative example shown in FIG. 7, an OFDM signal 700 propagating through the power line may be attenuated by as much as 12 dB during transmission through the power line. As a result, the frequency-domain pre-emphasis filter adjusts for such attenuation so that the attenuated portions of OFDM signal 700 are adjusted for the 12 dB loss. As a result, for this example, the higher tone frequencies 710 associated with OFDM signal 700 is attenuated to be two times larger in than lower tone frequencies 720 of signal 700. The compensation is normally static in nature based on prior testing, although it may be dynamic in nature or programmable.

Referring back to FIG. 5A, adaptive notching module 565 is configured to utilize data from frequency-domain pre-emphasis filter module 560 in order to place programmable notches in the frequency spectrum without any extra filtering. Hence, the adaptive notching scheme enables transmitter 400 to avoid data transmission over selected frequencies and may enable compliance with regional spectral/interference regulations. This notching may occur at the ends of the frequency spectrum, or may occur at selected frequencies within the frequency spectrum itself.

For instance, adaptive notching module 565 operates as a multiplier to "zero out" tones within the N-complex elements of the IFFT input vector. Based on a user-defined table, microcontroller 320 located within OFDM PLC PHY circuitry 300 of FIG. 3 is adapted to control the operations of adaptive notching module 565 of FIG. 5A by altering the filter coefficient values. This creates a different mapping table that is stored into registers accessed by the adaptive tone mapping module 550. The new mapping table will exclude certain frequency regions within a selected frequency band.

For instance, as an illustrative example, the CELENEC A standard supports a frequency spectrum ranging between 9 kHz and 95 kHz at a sample rate of 1.2 mega-samples. In order to notch all frequencies below 20 kHz, adaptive notching module 565 computes the kilohertz range for each IFFT complex element (N). For instance, where N is equal to 256, each IFFT complex element corresponds to 4.688 kHz. Hence, in order to avoid frequencies below 20 kHz, adapter tone mapping module 550 would need to set filter coefficient values for the frequencies associated with the first four (4) IFFT complex elements to zero, and thus, notch the frequency region between DC and 20 kHz.

However, in the event that the notch is to occur within the frequency spectrum, there may be overlapping between tones and thus it may require the number of IFFT complex elements to be expanded for this calculation. This would cause the "N" value, constituting the number of IFFT complex elements, to be multiplied by a selected multiplier M in order to increase resolution. As an example, where M is equal to four (M=4), this expands IFFT in order to notch frequency 50 kHz.

After frequency-domain pre-emphasis filter module 560 has performed the necessary attenuation offsets and adaptive notching module 565 has performed any desired frequency notching operations, IFFT module 570 using a N-bit IFFT input vector to formulate time domain OFDM words that will precede the cyclic prefix. In other words, IFFT module 570 converts information in the frequency domain into information in the time domain because subsequent operations on the channels are performed in the time domain.

Thereafter, cyclic prefix module 575 is responsible for mitigating ISI by creating a gap between the transmitted symbols. In other words, the programmable cyclic prefix length can be modified according to the delay spread of the channel. The reason is that the channel creates an anomaly by spreading the tones and the tone of one symbol too closely boarders a tone of another symbol. By adding the gap, this could prevent ISI interference.

Referring to FIGS. 4 and 5A, spectral shaping module 430 comprises an RC shaping module 580 and a time-domain pre-emphasis filter 585. RC shaping module 580 smoothes the OFDM signal by removing high frequency components. Time-domain pre-emphasis filter 585 provides a linear equalization method where the transmit signal spectrum is shaped to compensate for amplitude distortion and to further compensate the transmit signal for attenuation introduced to the signal as it propagates through the power line in the event that frequency domain pre-emphasis filter 560 is not able to accomplish the appropriate attenuation. As a result, time-domain pre-emphasis filter 585 operates as a shelving filter that performs both low pass and high pass filtering, where the gain may be adjusted during the low pass filtering in order to adjust the attenuation of the signal at the higher frequencies.

Referring back to FIG. 4, exemplary embodiment of an OFDM receiver 450 supporting multi-tone OFDM based communications within a prescribed low frequency region is shown. Receiver 450 comprises a plurality of logic modules including a data recovery module 460, demodulation module 470, a decoding module 480 and a channel reconfiguration module 490. Blind channel quality measurement scheme is used to adaptively change the coding and modulation used in a link in order to achieve reliable communications.

Figure 6:
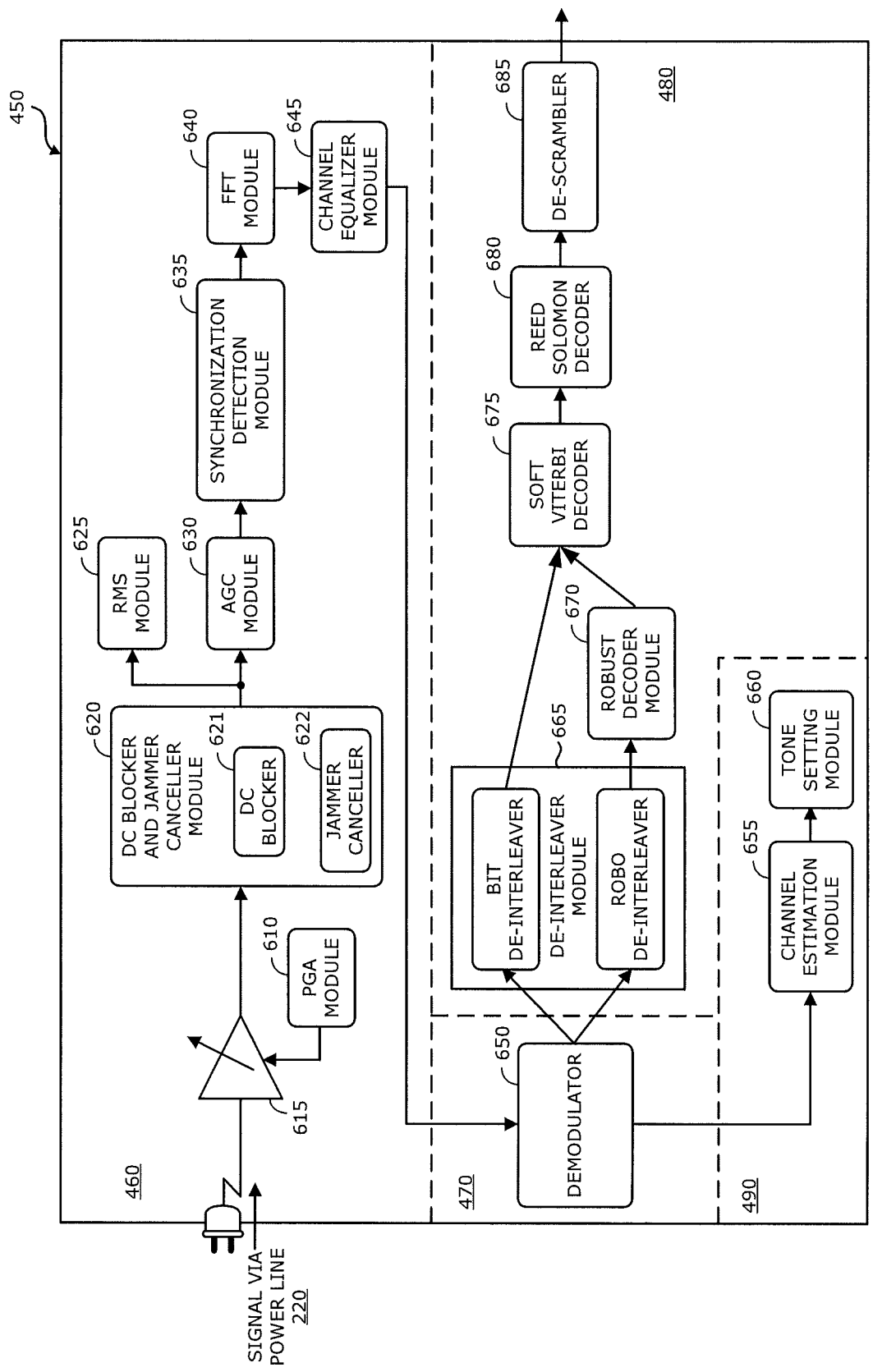
FIG. 6 illustrates a more detailed embodiment of a receiver of the networked device.

Referring now to FIG. 6, data recovery module 460 of OFDM receiver 450 comprises a programmable gain amplifier (PGA) module 610, a channel equalizer module 615, DC blocker and jammer cancellation modules 620, a root-mean-squared (RMS) module 625, an automatic gain control (AGC) module 630, a synchronization detection module 635 and a fast fourier transform (FFT) module 640.

First, PGA module 610 is adapted to manage the amplification of an incoming signal arriving at receiver 450 via power line 220. PGA module 610 measures the incoming signal and determines whether the signal is weak (gain below a predetermined threshold). If so, PGA module 610 adjusts the gain of amplifier 615 in order to amplify the incoming signal in order to achieve a sufficient amplification level for demodulation.

The adjusted signal is routed to DC blocker and jammer cancellation modules 620. DC blocker module 621 is adapted to remove the DC offset from the incoming signal since analog-to-digital converters and analog front-end circuitry are expected to apply at least some DC residual. Jammer cancellation module 622 is configured to detect the presence of a jammer signal and to remove it from the incoming signal. The removal of the DC offset and jamming signals is designed to avoid an incorrect reading by AGC module 630, which is designed to normalize the input signal to a predetermined power level. The presence of interference on the signal may affect gain adjustment of the incoming signal.

RMS module 625 is designed to measure the power of the signal and/or the signal-to-noise ratio (SNR) for use by channel estimation module 655 as described below.

After being adjusted by AGC module 630, which may be adapted to track signal variations and normalizes the received signal to be the proper bit size in order to ensure that soft Viterbi decoder 675 (below) operates optimally, the incoming signal is provided to synchronization detection module 635, which analyzes the contents of the incoming signal to detect the beginning of the preamble symbols and the data symbols. Moreover, synchronization detection module 635 determines the mode of operation of the current PHY frame (Normal or Robust).

As soon as the start of the data symbol is determined and the channel, such data is routed to FFT module 640 to convert the time domain information into the frequency domain. Thereafter, a channel equalizer module 645 performs an adaptive frequency-domain channel equalization (FEQ) technique that compensates for severe attenuation in the channel at high frequencies by equalizing the received signal based on the received signal level of each tone.

As an example, channel equalizer module 645 may feature a table including a set of complex coefficients that are used to correct the amplitude and phase of each sub-carrier where OFDM is used for modulation. The FEQ technique performed by module 645 corrects for the phase and the amplitude distortion introduced into each subcarrier by multiplying the received constellation point of a subcarrier (in the frequency domain) with a complex value that is adaptive (e.g., compute using a least mean squares update algorithm). By being made adaptive, channel equalizer module 645 will be able to adjust for variations between various channels, and also, will be able to track variations in the same channel that may occur due to temperature variations and other parameters. In other words, channel equalizer module 645 is adapted to address frequency selective, fading channels. Of course, channel equalizer module 645 could be static in an alternative embodiment.

The output data from channel equalizer module 645 is provided to demodulator module 470. As shown in FIGS. 4 and 6, demodulator module 470 comprises a demodulator 650 that demodulates the incoming signal in order to recover data contained therein. As an illustrative embodiment, the incoming signal is demodulated in accordance with a selected demodulation scheme such as differential binary phase shift keen (DBPSK). The output from demodulator 650 is provided to channel reconfiguration module 490.

Channel reconfiguration module 490 comprises channel estimation module 655 that utilizes the SNR measurements as measured by RMS module 625 to determine whether the signal quality is acceptable to operate a Normal mode or whether receiver 450 needs to operate in ROBO mode. In general, channel estimation module 655 performs two operations.

First, channel estimation module 655 determines whether the incoming signal exceeds a predetermined SNR value. If the incoming signal features signal-to-noise (SNR) ratio that exceeds the predetermined SNR value, receiver 450 will enter into Normal mode and will signal its transmitter via the MAC layer to transmit a message for receipt by the device featuring transmitter 400 to enter into ROBO mode as well. However, if the SNR levels are satisfactory but the channel is adversely affecting the characteristics of a signal, such as not sufficiently detecting the tones or grossly attenuating the tones, receiver 450 will enter into ROBO mode and signal the corresponding transmitter to enter into ROBO mode.

Besides channel estimation, receiver 450 may signal the corresponding transmitter 400 to adjust the number of tones in the event that the channel attenuation eliminates certain tones and the elimination of such tones does not adversely affect the operations of the system. The tone numbering is set by a tone setting module 660 implemented within channel reconfiguration module 490.

Based on whether receiver 450 is operating Normal mode or ROBO mode, de-interleaver module 665 of decoding module 480 recovers the data distributed by the interleaver module of transmitter 400 and provides such data to a soft robust decoder module 670 or directly to convolutional decoder module 675, a Reed-Solomon decoder module 680 and a descrambler module 685 in order to recover the data.

It is noted that AGC module 630 improves the performance of the soft robust decoder module because by normalizing the input data ensure that soft robust decoder module 670 receives enough bits to predict the right information. Herein, soft robust decoder module 670 is in communication with de-interleaver module 665 that makes a determination as to the bit value based on repetitive bits that it analyzes. In other words, soft robust decoder module 670 is an intelligent component that makes a decision as to what is the right value associated with the repetitive data bits in order to fully utilize the coding gained from Robust mode. This is accomplished by giving more weight to sub-carriers of better quality and less noise (e.g. based on SNR measurements) because, more likely than not, the data of these sub-carriers is accurate.

While the invention has been described in terms of several embodiments, the invention should not be limited to only those embodiments described, but can be practiced with modification and alteration within the spirit and scope of the invention as will be claimed.

What is claimed is:

1. A first network device connected by a power line to a distribution transformer, the first network device comprising:
   a transceiver to communicate with a second network device via the power line through the distribution transformer in a frequency band from 1 kHz to 600 kHz;
   a tone mapping module to select orthogonal tones in the frequency band for modulation based on a mapping table; and
   a pre-emphasis module to pre-emphasize at least one of the selected orthogonal tones to compensate for attenuation of a signal transmitted through the power line,
   wherein the transceiver receives a channel estimate generated by the second network device based on the signal to adjust the mapping table and pre-emphasis.

2. The first network device of claim 1, wherein the tone mapping module and the pre-emphasis module respectively adjust the mapping table and pre-emphasis based on the channel estimation received from the second network device.

3. The first network device of claim 1, further comprising an interleaver to interleave data, to operate in a plurality of modes, and to perform repetitive encoding on the data in one of the plurality of modes.

4. The first network device of claim 3, further comprising an encoder to randomize the data and to insert error correction data.

5. The first network device of claim 3, further comprising a modulator to modulate the data to the selected orthogonal tones.

6. The first network device of claim 3, further comprising a selector to select one of the plurality of modes of the interleaver based on the channel estimate.

7. The first network device of claim 3, wherein:
   the interleaver randomizes the data during a first one of the plurality of modes, and reduces a data rate and performs the repetitive encoding in a second one of the plurality of modes; and
   the repetitive encoding includes repeating bits and placing each repetition of the bits at different frequencies and within different symbols.

8. The first network device of claim 3, wherein:
   the interleaver comprises a plurality of sub-interleavers; and
   at least one of the sub-interleavers reverses an order of packets.

9. The first network device of claim 1, further comprising a preamble insertion module to insert a preamble into each frame to identify a type of modulation performed on data within the frame.

10. The first network device of claim 1, further comprising a filter module to multiply at least one of the selected orthogonal tones by a coefficient to compensate for attenuation caused by channel characteristics.

11. The first network device of claim 1, further comprising a notching module to place programmable notches in the frequency band to avoid data transmission over the one or more of the selected orthogonal tones.

12. The first network device of claim 1, wherein the power line is an alternating current power line.

* * * * *